Patented June 5, 1928.

1,672,340

UNITED STATES PATENT OFFICE.

CURT RÄTH, OF BERLIN, GERMANY.

DERIVATIVES OF 3- OR 5- IODO PYRIDINE.

No Drawing. Application filed November 10, 1926, Serial No. 147,609, and in Austria October 17, 1925.

It is known (see for example German Patent No. 400191) that when chlorine acts on substituted pyridine derivatives, chlorination readily occurs in the nucleus, even in the cold.

This rule has also been confirmed by applicants, who have obtained products chlorinated in the nucleus in all cases of the action of free chlorine on pyridine derivatives, such for example, as 2-chlor-5-amidopyridine, 2-6-diaminopyridine, 2-amino-5-nitropyridine or 2-amino-5-bromopyridine.

Confirmation of the rule has also been obtained in the chlorination of pyridine compounds containing iodine in the 2-, 4- or 6- position. For example, if free chlorine be allowed to act on 2-iodo-5-aminopyridine in solution in glacial acetic acid, the mixture being adequately cooled and energetically shaken, an approximately quantitative yield of 2-iodo-3-chlor-5-aminopyridine, of the formula

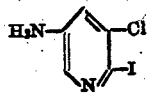

is obtained.

It has now been unexpectedly discovered that the reaction proceeds in quite a different manner when pyridine compounds containing iodine in the 3- or 5- position are employed as the originating materials, there being, in these cases, no chlorination in the nucleus; whereas a satisfactory yield of the corresponding iodochlorides is obtained.

Thus, for example, 5-iodopyridine furnishes the iodochloride

and 2-chlor-5-iodopyridine the iodochloride

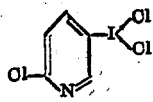

The iodochlorides which can be prepared according to the invention are distinguished by extremely powerful bactericidal properties, the active agents, during practical application being the liberated chlorine on the one hand and the decomposition-product itself (for example, the 2-chlor-5-iodopyridine) on the other.

Moreover, the pyridyl iodochlorides preparable according to the invention constitute excellent initial material for the preparation of iodoso- and iodoxy-pyridine compounds.

For example, the pyridine iodochlorides of the general formula, pyridine-$ICl_2$, can be transformed, by treatment with alkali, into the corresponding iodosopyridine, of the general formula, pyridyl-$I=O$. The resulting iodosopyridines can then be transformed into the corresponding iodoxy-compounds of the general formula, pyridyl-$I=O_2$; for example, by heating, with or without the presence of diluents such as water or water vapour. It has been ascertained that isolation of the iodoso-compounds prior to transformation into the iodoxy-compounds is unnecessary.

The following examples will serve to show how the process of this invention can be carried into effect:

1. Chlorine is passed into a solution of $\beta$-iodopyridine (cooled by means of ice water), until the liquid is saturated. The iodochloride comes down in the form of delicate yellow needles, which are only very sparingly soluble in the usual organic solvents in the cold, and moderately soluble in the warm. The yield is quantitative, and the product melts (undergoing decomposition) at 128–130°. The resulting iodochloride gives off an intensive smell, recalling that of chlorine. The formula of the obtained product is

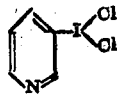

2. Chlorine is passed, to saturation, into a solution of $\alpha$-chlor-$\beta'$-iodopyridine, a quantitative yield of the corresponding iodochloride being obtained in the form of a yellow crystalline powder melting (with liberation of chlorine) at 104–106°. The iodochloride is almost insoluble in the usual organic solvents and in water; and gives off a powerful smell recalling that of chlorine. The formula of the obtained product is

3. α-chlor-β'-iodochlorpyridine is suspended in dilute caustic soda for several hours, and is then aspirated off and washed with water. The yellow needles of the iodochloride have been transformed into the slightly yellow tinged iodoso-compound, α-chlor-β'-iodosopyridine, which decomposes, with separation of iodine, at 200–205°. The iodoso-compound is amorphous, soluble in glacial acetic acid, but very sparingly soluble in water and the usual organic solvents. It constitutes a powerful oxidizing agent. The formula of the obtained product is

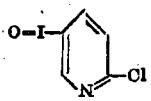

4. Steam is blown through an aqueous suspension of α-chlor-β'-iodosopyridine, and carries off α-chlor-β'-iodoxypyridine, whilst, on concentrating the steam-distillation residue, the α-chlor-β'-iodoxypyridine crystallizes out in the form of white needles. This compound detonates, with separation of iodine, at 210–215°. It is very sparingly soluble in the usual organic solvents, but soluble in glacial acetic acid. The compound is a powerful oxidizing agent, and liberates chlorine when treated with hydrochloric acid. The formula of the obtained product is

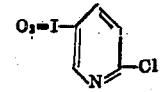

What I claim is:
1. A process for the production of new derivatives of pyridin, which consists in causing chlorine to react on pyridin compounds which contain iodine in the 3- or 5-position.
2. A process for the production of new derivatives of pyridin, which consists in causing chlorine to react on pyridin compounds which contain iodine in the 3- or 5-position and converting the iodochloride obtained into the corresponding iodoso compounds by treatment with alkali.
3. As a new product of manufacture a pyridin compound which contains the group

in the 3- or 5- position.
4. As a new product of manufacture a pyridin compound which contains the group

in the 3- or 5- position and, in addition, other substituting groups.

Signed at Berlin, Brandenburg, Prussia this 18th day of October A. D. 1926.

CURT RÄTH.